US010298285B2

(12) United States Patent
Lee

(10) Patent No.: US 10,298,285 B2
(45) Date of Patent: May 21, 2019

(54) SEMICONDUCTOR DEVICE

(71) Applicant: SK hynix Inc., Gyeonggi-do (KR)

(72) Inventor: Seong Ju Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 8 days.

(21) Appl. No.: 15/655,249

(22) Filed: Jul. 20, 2017

(65) Prior Publication Data

US 2018/0219572 A1    Aug. 2, 2018

(30) Foreign Application Priority Data

Jan. 31, 2017   (KR) .................. 10-2017-0013779

(51) Int. Cl.
    *H04B 1/40*          (2015.01)
(52) U.S. Cl.
    CPC ....................................... *H04B 1/40* (2013.01)
(58) Field of Classification Search
    CPC ......... H04B 1/40; H04B 1/0471; H04B 1/525
    See application file for complete search history.

(56) References Cited

U.S. PATENT DOCUMENTS

| 8,908,450 B1* | 12/2014 | Wronski ............. G11C 11/4076 365/193 |
| 2004/0199786 A1* | 10/2004 | Walmsley ............ B41J 2/04505 713/190 |
| 2006/0126404 A1* | 6/2006 | Sohn ........................ G11C 5/04 365/189.05 |
| 2010/0225557 A1* | 9/2010 | Rofougaran ............ H01L 23/66 343/860 |

FOREIGN PATENT DOCUMENTS

| KR | 1020150120617 | 10/2015 |
| KR | 1020150140100 | 12/2015 |

* cited by examiner

*Primary Examiner* — Shuwang Liu
*Assistant Examiner* — Gina M McKie
(74) *Attorney, Agent, or Firm* — IP & T Group LLP

(57) ABSTRACT

A semiconductor device includes a plurality of chips, at least one line, and a controller. Each of the chips includes a chip input/output (I/O) pad, a transceiver configured to perform a transmission operation in response to a transmission enable signal or perform a reception operation in response to a reception enable signal, and a switch configured to couple the chip input/output (I/O) pad to the transceiver in response to a switch enable signal. The at least one line is configured to couple the chip input/output (I/O) pads contained in the plurality of chips. The controller generates the transmission enable signal, the reception enable signal, and the switch enable signal in response to a command signal and a chip identifier (ID) signal.

20 Claims, 17 Drawing Sheets

SEMICONDUCTOR DEVICE

CROSS-REFERENCE TO RELATED APPLICATION

This application claims priority based upon Korean patent application No. 10-2017-0013779, filed on Jan. 31, 2017, the disclosure of which is hereby incorporated in its entirety by reference herein.

BACKGROUND OF THE INVENTION

Embodiments of the present disclosure relate to a semiconductor device, and more particularly to a technology for a connection structure of input/output (I/O) pads contained in a semiconductor device including a plurality of chips.

In recent times, with the rapid development of semiconductor industry and the increasing number of user demands, electronic appliances have been developed to implement products having smaller sizes and lighter weights. In order to meet such demands, various technologies have been used. One such technology is a multi-chip package (MCP) technology that integrates a plurality of semiconductor chips into one package. The MCP technology is more advantageous to implement smaller-sized and lighter-weight products than older technologies using a plurality of packages each having a single semiconductor chip.

The plurality of semiconductor chips contained in the multi-chip package (MCP) may input/output data through one or more external input/output (I/O) pads. For this purpose, a chip I/O pad contained in each semiconductor chip must be coupled to the external I/O pad.

However, when viewed from a certain semiconductor chip, connection to another semiconductor chip may cause noise during data transmission, may limit the data transfer rate, and may cause a current to flow into another semiconductor chip, resulting in an increased current.

BRIEF SUMMARY OF THE INVENTION

Various embodiments of the present disclosure are directed to providing a semiconductor device that substantially obviates one or more problems due to limitations and disadvantages of the related art.

An embodiment of the present disclosure relates to a technology for reducing load by separating connection of a semiconductor chip configured not to transmit data, to thereby reduce an operation current.

In accordance with an embodiment of the present disclosure, a semiconductor device includes: a plurality of chips, each including a chip input/output (I/O) pad, a transceiver configured to perform a transmission operation in response to a transmission enable signal or perform a reception operation in response to a reception enable signal, and a switch configured to couple the chip input/output (I/O) pad to the transceiver in response to a switch enable signal at least one line configured to couple the chip input/output (I/O) pads contained in the plurality of chips; and a controller configured to generate the transmission enable signal, the reception enable signal, and the switch enable signal in response to a command signal and a chip identifier (ID) signal.

In accordance with another embodiment of the present disclosure, a semiconductor device includes: a first chip including a common transceiver configured to perform a transmission operation in response to a common transmission enable signal or perform a reception operation in response to a common reception enable signal, a first transceiver configured to perform a transmission operation in response to a first transmission enable signal or perform a reception operation in response to a first reception enable signal, and a switch configured to couple the common transceiver to the first transceiver in response to a switch enable signal; a second chip including a second transceiver coupled to the first transceiver through a line, configured to perform a transmission operation in response to a second transmission enable signal or a reception operation in response to a second reception enable signal; and a controller configured to generate the common transmission enable signal, the common reception enable signal, the first transmission enable signal, the first reception enable signal, and the switch enable signal, the second transmission enable signal and the second reception enable signal, in response to a command signal and a chip identifier (ID) signal.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other features and advantages of the present disclosure will become apparent by reference to the following detailed description when considered in conjunction with the accompanying drawings wherein.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

It is noted that the drawings are simplified schematics and as such are not necessarily drawn to scale. In some instances, various parts of the drawings may have been exaggerated in order to more clearly illustrate certain features of the illustrated embodiments.

It is further noted that in the following description, specific details are set forth for facilitating the understanding of the present invention, however, the present invention may be practiced without some of these specific details. Also, it is noted, that well-known structures and/or processes may have only been described briefly or not described at all to avoid obscuring the present disclosure with unnecessary well known details.

It is also noted, that in some instances, as would be apparent to those skilled in the relevant art, an element (also referred to as a feature) described in connection with one embodiment may be used singly or in combination with other elements of another embodiment, unless specifically indicated otherwise.

Figure 1:
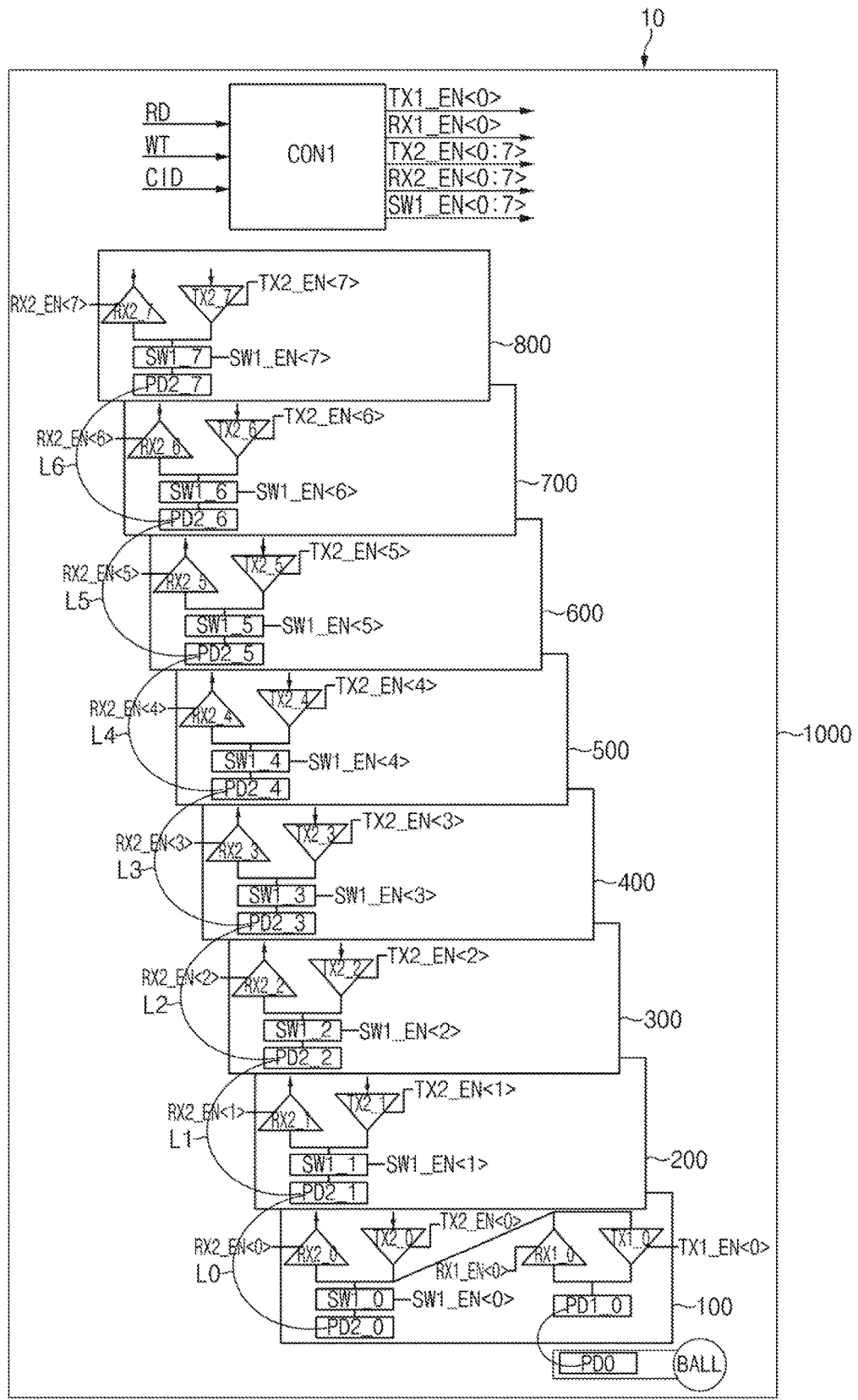
FIG. 1 is a schematic illustrating a semiconductor device according to an embodiment of the present disclosure.

FIG. 1 is a schematic illustrating a semiconductor device 10 according to an embodiment of the present disclosure.

Referring to FIG. 1, the semiconductor device 10 may include a substrate 1000, an external input/output (I/O) pad PD0 formed over the substrate 1000 to transmit/receive data to/from an external device (not shown) a plurality of chips (i.e., first to eighth chips) 100 to 800, lines L0 to L6, and a controller CON1.

Although it is assumed that the semiconductor device 10 of FIG. 1 includes 8 chips 100 to 800 for convenience of description, the number of chips contained in the semiconductor device 10 is not limited thereto. In addition, although it is assumed that the plurality of chips 100 to 800 shown in FIG. 1 is vertically stacked for convenience of description, the scope or spirit of the present disclosure is not limited thereto. For example, the plurality of chips 100 to 800 may be arranged in a horizontal direction.

The first chip 100 may include a first pad PD1_0, first transceivers (common transceivers) TX1_0 and RX1_0, a second pad PD2_0, a switch SW1_0, and second transceivers TX2_0 and RX2_0. The second to, eighth chips 200 to 800 may respectively include second pads PD2_1 to PD2_7, switches SW1_1 to SW1_7, and second transceivers TX2_1 to TX2_7 and RX2_1 to RX2_7. The external I/O pad PD0 may be coupled to a solder ball BALL. The semiconductor device 10 may be coupled to the external device through the solder ball BALL.

The connection relationship of the constituent elements contained in the first chip 100 will hereinafter be described. In the first chip 100, the first pad PD1_0 may be coupled to the external I/O pad PD0. The first transceiver TX1_0 and RX1_0 may be coupled to the first pad PD1_0. The second transceiver TX2_0 and RX2_0 may be coupled to the first transceiver TX1_0 and RX1_0. The second transceiver TX2_0 and RX2_0 may be coupled to the second pad PD2_0 through the switch SW1_0. The second transceiver TX2_0 and RX2_0 may transmit internal data of the first chip 100 to the second pad PD2_0 through the switch SW1_0, or may receive data transmitted through the switch SW1_0 to the first chip 100.

In the second to eighth chips 200 to 800, the second transceivers TX2_1 to TX2_7 and RX2_1 to RX2_7 may be coupled to the second pads PD2_1 to PD2_7 through the switches SW1_1 to SW1_7, respectively. The second transceivers TX2_1 to TX2_7 and RX2_1 to RX2_7 may transmit internal data of the second to eighth chips 200 to 800 to the second pads PD2_1 to PD2_7 through the switches SW1_1 to SW1_7, or may, receive data transmitted through the switches SW1_1 to SW1_7 to the second to eighth chips 200 to 800, respectively.

Two adjacent second pads PD2_0 to PD2_7 may be coupled through a corresponding one of the lines L0 to L6. That is, the second pad PD2_0 of the first chip 100 may be coupled to the second pad PD2_1 of the second chip 200 through the line L0, and the second pad PD2_1 of the second chip 200 may be coupled to the second pad PD2_2 of the third chip 300 through the line L1. In this way, the second pad PD2_6 of the seventh chip 700 may be coupled to the second pad PD2_7 of the eighth chip 800 through the line L6.

Upon receiving a command (e.g., a read command RD or a write command WT) and a chip identifier (ID) signal CID, the controller CON1 may generate a first transmission enable signal TX1_EN<0>, a first reception enable signal RX1_EN<0>, second transmission enable signals TX2_EN<0:7>, second reception enable signals RX2_EN 0:7>, and switch enable signals SW1_EN 0:7>. The first transmission enable signal TX1_EN<0> may enable a first transmitter TX1_0 contained in the first transceiver TX1_0 and RX1_0 of the first chip 100, and the first reception enable signal RX1_EN<0> may enable a first receiver RX1_0 contained in the first transceiver TX1_0 and RX1_0 of the first chip 100. The second transmission enable signals TX2_EN<0:7> may enable second transmitters TX2_0 to TX2_7 respectively contained in the second transceivers TX2_0 to TX2_7 and RX2_0 to RX2_7 of the first to eighth chips 100 to 800, and the second reception enable signals RX2_EN 0:7> may enable the second receivers RX2_0 to RX2_7 respectively contained in the second transceivers TX2_0 to TX2_7 and RX2_0 to RX2_7 of the first to eighth chips 100 to 800. In addition, the switch, enable signals SW1_EN 0:7> may enable the switches SW1_0 to SW1_7 respectively contained in the first to eighth chips 100 to 800.

Upon receiving the command (e.g., the write command WT) and the chip ID signal CID for transmitting data to the semiconductor device 10, the controller CON1 may enable the first reception enable signal RX1_EN<0>, at least one of the second reception enable signals RX2_EN<0> to RX2_EN<7> of at least one of the chips 100 to 800 corresponding to the chip ID signal CID, and at least one of the switch enable signals SW1_EN<0> to SW1_EN<7>, and may then, disable the remaining signals. In addition, upon receiving the command (e.g., the read command RD) and the chip ID signal CID for outputting data from the semiconductor device 10, the controller CON1 may enable the first transmission enable signal TX1_EN<0>, at least one of the second transmission enable signals TX2_EN<0> to TX2_EN<7> of at least one of the chips 100 to 800 corresponding to the chip ID signal CID, and at least one of the switch enable signals SW1_EN<0> to SW1_EN<7>, and may then disable the remaining signals. That is, upon receiving the command and the chip ID signal CID, the controller CON1 may generate control signals to form a data transmission path ranging from the second transceiver of any one of the chips 100 to 800 corresponding to the chip ID signal CID to the first transceiver TX1_0 and RX1_0 contained in the first chip 100.

Although the controller CON1 of FIG. 1 is formed over the substrate 1000 for convenience of description, the scope or spirit of the present disclosure is not limited thereto. For example, the controller CON1 may be formed in the first chip 100. Alternatively, the controller CON1 may also be formed in any one of the second to eighth chips 200 to 800 as necessary.

Figure 2:
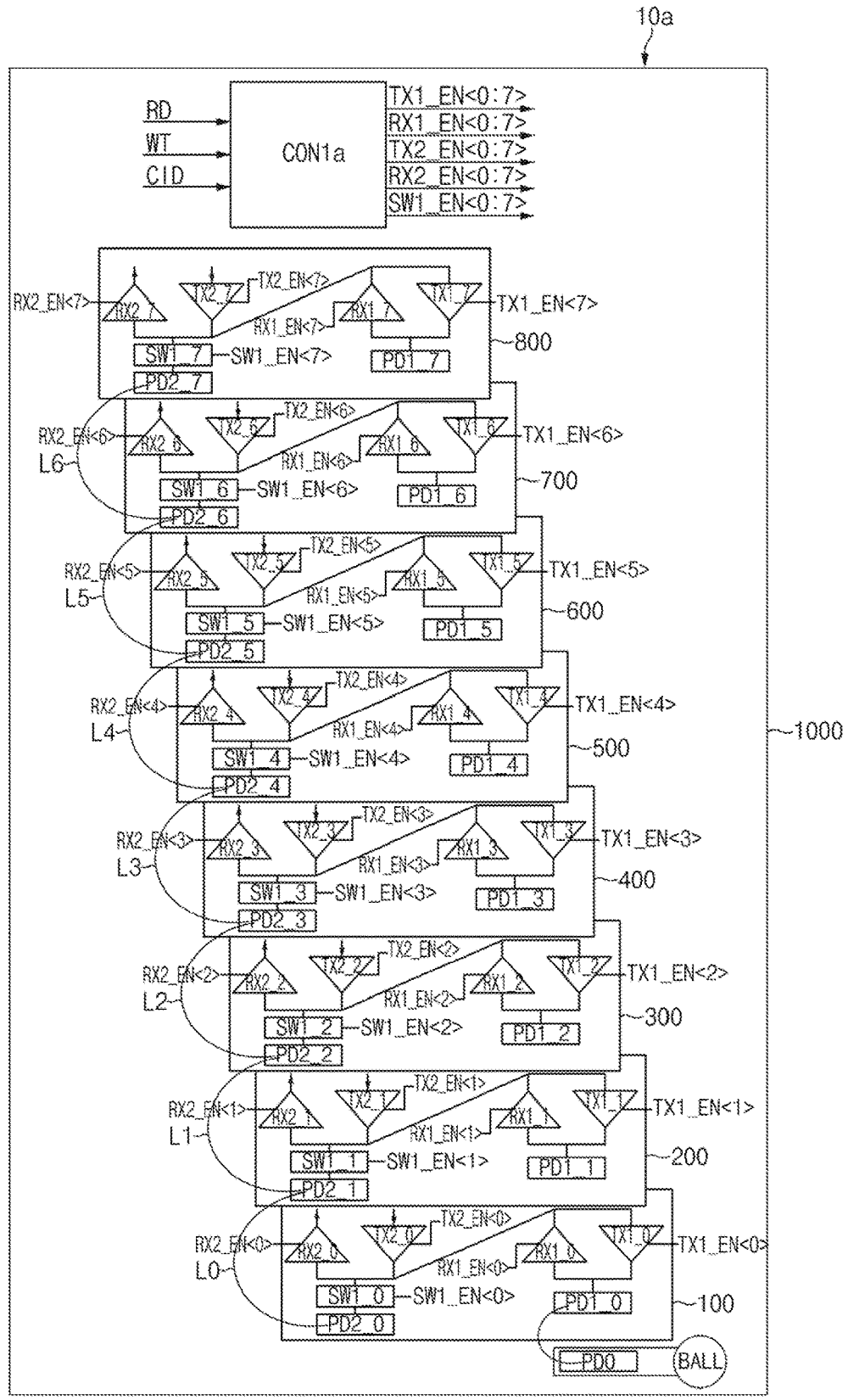
FIG. 2 is a schematic illustrating a semiconductor device according to an embodiment of the present disclosure.

FIG. 2 is a schematic illustrating a semiconductor device 10a according to an embodiment of the present disclosure.

Referring to FIGS. 1 and 2, the semiconductor device 10a may further include first pads PD1_1 to PD1_7 and first transceivers TX1_1 to TX1_7 and RX1_1 to RX1_7 contained in the second to eighth chips 200 to 800, as compared to the semiconductor device 10 of FIG. 1. The plurality of chips 100 to 800 contained in the semiconductor device 10a may include the same constituent elements as those of FIG. 1 for convenience of semiconductor fabrication. Therefore, as shown in FIG. 2, the first pads PD1_1 to PD1_7 corresponding to the first pad PD1_0 and the first transceivers TX1_1 to TX1_7 and RX1_1 to RX1_7 corresponding to the first transceiver TX1_0 and RX1_0 may be formed not only in the first chip 100 but also in the second to eighth chips 200 to 800. In this case, since data may be received to or transmitted from the second to eighth chips 200 to 800 through the second transceivers TX2_1 to TX2_7 and RX2_1 to RX2_7, the first transceivers TX1_1 to TX1_7 and RX1_1 to RX1_7 need not be operated. Therefore, the controller CON1a may further generate the first transmission enable signals TX1_EN<1:7> and the first reception enable signals RX1_EN<1:7> so as not to operate the first transceivers TX1_1 to TX1_7 and RX1_1 to RX1_7. In other words, the controller CON1a may disable the first transmission enable signals TX1_EN<1:7> and the first reception enable signals RX1_EN<1:7> and may not operate the first transceivers TX1_1 to TX1_7 and RX1_1 to RX1_7.

Alternatively, in order not to operate the first transceivers TX1_1 to TX1_7 and RX1_1 to RX1_7, a fuse (e.g. a metal fuse or an electric fuse (E-fuse)) may be disposed between the first transceivers TX1_1 to TX1_7 and RX1_1 to RX1_7 and the second transceivers TX2_1 to TX2_7 and RX2_1 to RX2_7, and only fuses contained in the second to eighth chips 200 to 800 may be blown or cut. Accordingly, the second transceivers TX2_1 to TX2_7 and RX2_1 to RX2_7 may be separated from the first transceivers TX1_1 to TX1_7 and RX1_1 to RX1_7, such that the second transceivers TX2_1 to TX2_7 and RX2_1 to RX2_7 may not operate.

Figure 3A:
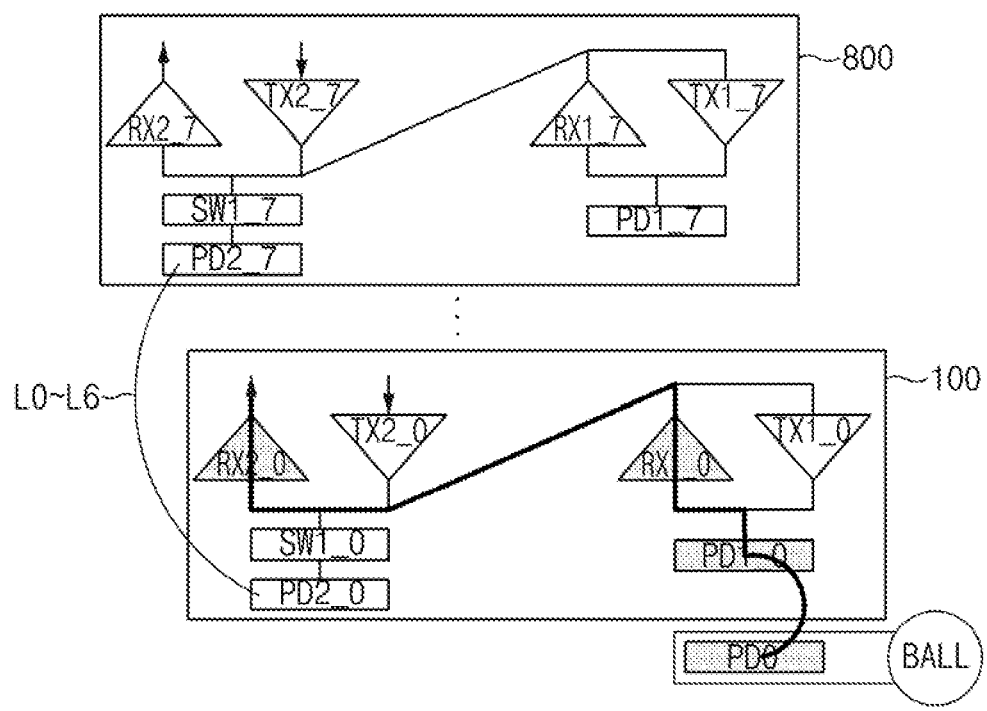
FIG. 3A is a schematic illustrating a data transmission path formed when write command and chip ID signal corresponding to a first chip are provided to the semiconductor device FIG. 2.

FIG. 3A is a schematic illustrating a data transmission path formed when the write command WT and the chip ID signal CID corresponding to the first chip 100 are provided to the semiconductor device 10a of FIG. 2.

Referring to FIGS. 2 and 3A, upon receiving the write command WT and the chip ID signal CID corresponding to the first chip 100, the controller CON1a may enable the first reception enable signal RX1_EN<0>, the second reception enable signal RX2_EN<0>, and the switch enable signal SW1_EN<0>, and may disable the remaining signals. Therefore, as shown in FIG. 3A, a data transmission path sequentially passing through the external I/O pad PD0, the first pad PD1_0 contained in the first chip 100, the first receiver RX1_0 contained in the first chip 100, and the second receiver RX2_0 contained in the first chip 100 may be formed. In this case, since the first receiver RX1_0 of the first chip 100 is coupled to the second receiver RX2_0 of the first chip 100 when the chip ID signal CID corresponds to the first chip 100, data may be transferred from the first receiver RX1_0 of the first chip 100 to the second receiver RX2_0 of the first chip 100. Accordingly, the switch enable signal SW1_EN<0> may not be enabled. In other words, it is not necessary to enable the switch enable signal SW1_EN<0>, and it is possible both to enable and not to enable the switch enable signal SW1_EN<0>.

Figure 3B:
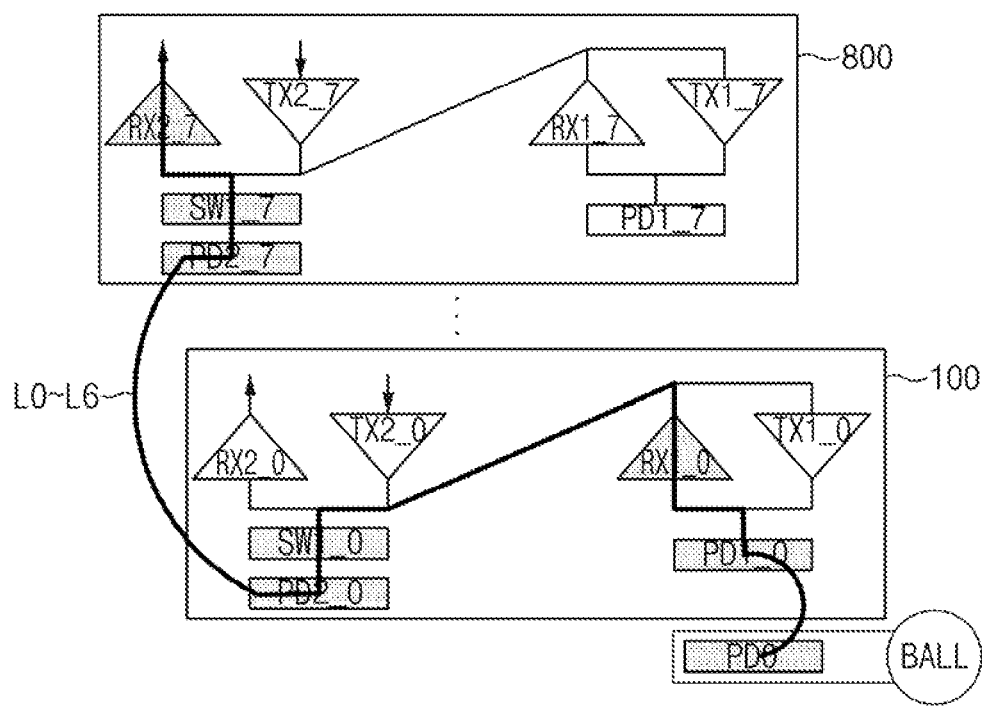
FIG. 3B is a schematic illustrating a data transmission path formed when a write command and a chip ID signal corresponding to an eighth chip are provided to the semiconductor device FIG. 2.

FIG. 3B is a schematic illustrating a data transmission path formed when the write command WT and the chip ID signal CID corresponding to the eighth chip 800 are provided to a semiconductor device 10a of FIG. 2.

Referring to FIGS. 2 and 3B, upon receiving the write command WT and the chip ID signal CID corresponding to the eighth chip 800 the controller CON1a may enable the first reception enable signal RX1_EN 0>, the switch enable signal SW1_EN<0>, the switch enable signal SW1_EN<7>, and the second reception enable signal RX2_EN<7>. Therefore, as shown in FIG. 3B, a data transmission path sequentially passing through the external I/O pad PD0, the first pad PD1_0 contained in the first chip 100, the first receiver RX1_0 contained in the first chip 100, the switch SW1_0 in the first chip 100, the second pad PD2_0 in the first chip 100, the lines L0 to L6, the switch SW1_7 in the eighth chip 800, and the second receiver RX1_7 contained in the eighth chip 800 may be formed.

Figure 4A:
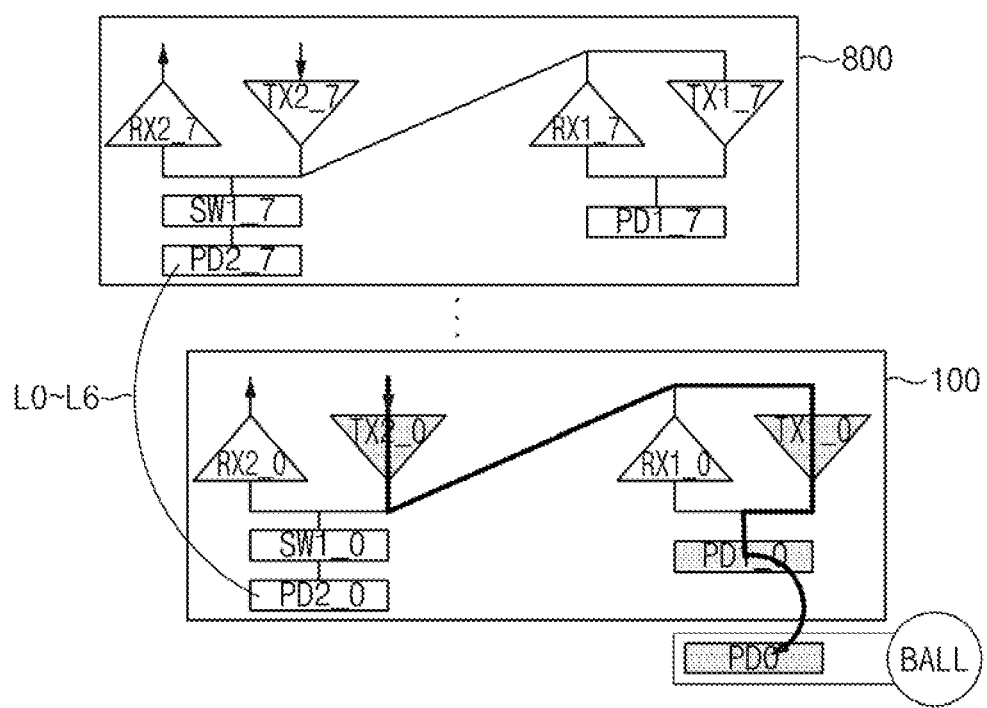
FIG. 4A is a schematic illustrating a data transmission path formed when read command and chip ID signal corresponding to a first chip are provided to the semiconductor device of FIG. 2.

FIG. 4A is a schematic illustrating a data transmission path formed when the read command RD and the chip ID signal CID corresponding to the first chip 100 are provided to the semiconductor device 10a of FIG. 2.

Referring to FIGS. 2 and 4A, upon receiving the read command RD and the chip ID signal CID corresponding to the first chip 100, the controller CON1a may enable the first transmission enable signal TX1_EN<0>, the second transmission enable signal TX2_EN<0>, and the switch enable signal SW1_EN<0>, and may disable the remaining signals. Therefore, as shown in FIG. 4A, a data transmission path sequentially passing through the second transmitter TX2_0 of the first chip 100, the first transmitter TX1_0 of the first chip 100, the first pad PD1_0 of the first chip 100, and the external I/O pad PD0 may be formed.

In this case, the first transmitter TX1_0 of the first chip 100 is coupled to the second transmitter TX2_0 of the first chip 100 when the chip ID signal CID corresponds to the first chip 100, such that data may be transferred from the second transmitter TX2_0 of the first chip 100 to the first transmitter TX1_0 of the first chip 100. As a result, the switch enable signal SW1_EN<0> may not be enabled.

Figure 4B:
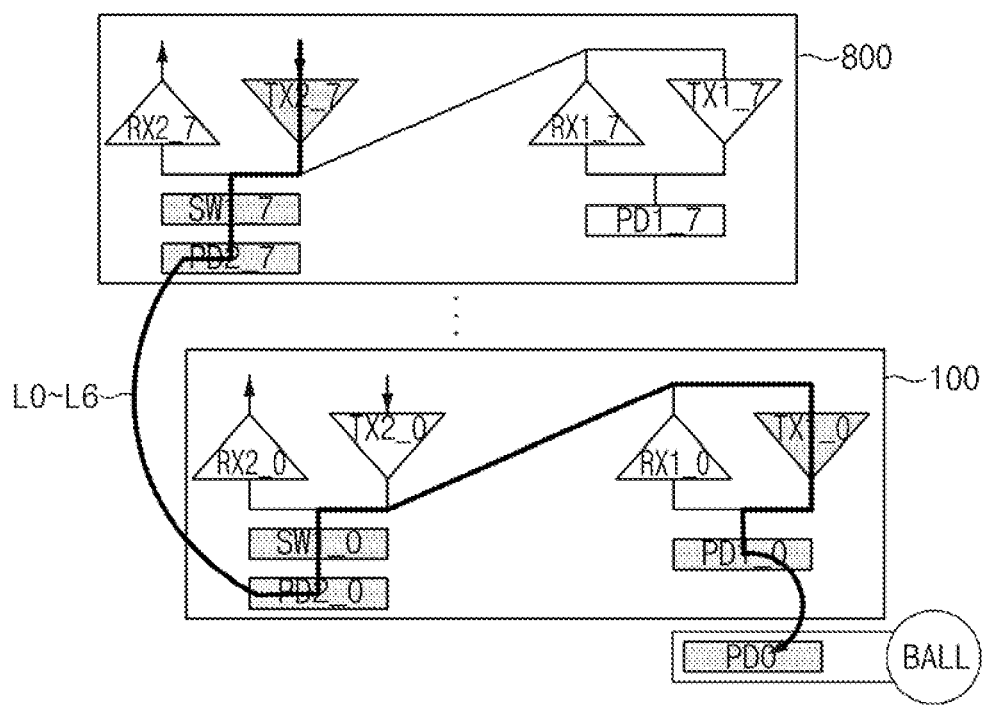
FIG. 4B is a schematic illustrating a data transmission path formed when a read command and a chip ID signal corresponding to an eighth chip are provided to the semiconductor device of FIG. 2.

FIG. 4B is a schematic illustrating a data transmission path formed when the read command RD and the chip ID signal CID corresponding to the eighth chip 800 are provided to the semiconductor device 10*a* of FIG. 2.

Referring to FIGS. 2 and 4B, upon receiving the read command RD and the chip ID signal CID corresponding to the eighth chip 800, the controller CON1*a* may enable the first transmission enable signal TX1_EN<0>, the second transmission enable signal TX2_EN<7>, the switch enable signal SW1_EN<0>, and the switch enable signal SW1_EN<7>. Therefore, as shown in FIG. 4B, a data transmission path sequentially passing through the second transmitter TX2_7 of the eighth chip 800, the first transmitter TX1_0 of the first chip 100, the first pad PD1_0 of the first chip 100, and the external I/O pad PD0 may be formed.

Although the data transmission path of the semiconductor device 10*a* of FIG. 2 has been exemplarily disclosed with reference to FIGS. 3A, 3B, 4A, and 4B, the data transmission path of FIG. 2 may also be similarly applied to the semiconductor device 10 of FIG. 10. For example, the semiconductor device 10 of FIG. 1 may not include the first pads PD1_1 to PD1_7 and the first transceivers TX1_1 to TX1_7 and RX1_1 to RX1_7. Therefore, the controller CON1 may not generate the first transmission enable signals TX1_EN<1:7> and the first reception enable signals RX1_EN<1:7> needed to control the above-mentioned constituent elements.

Figure 5:
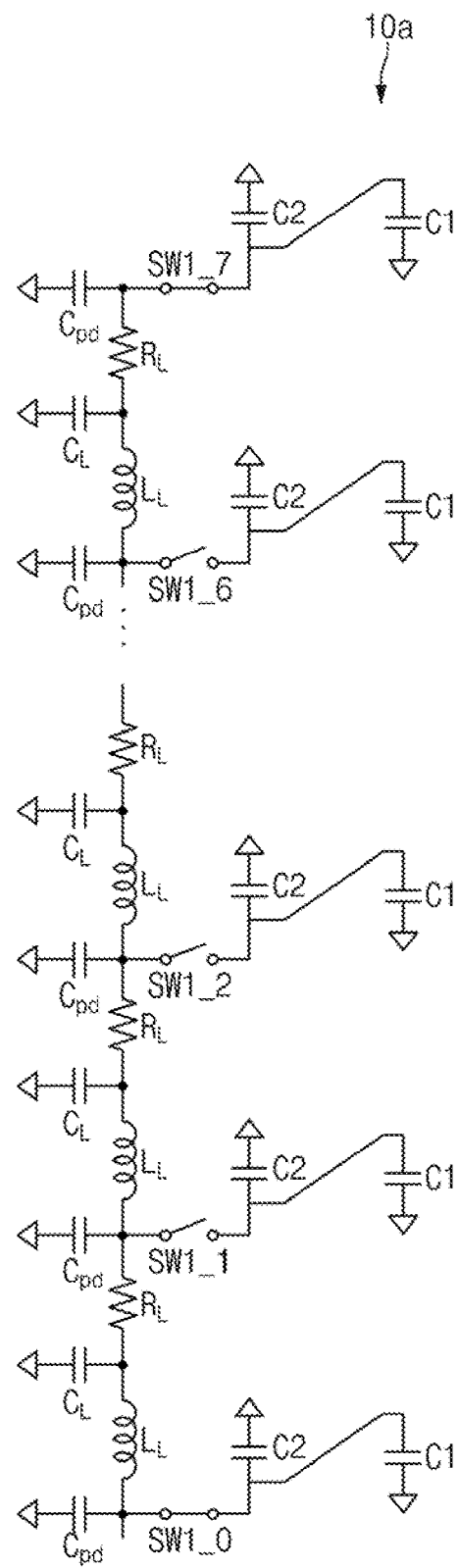
FIG. 5 is a circuit diagram illustrating an equivalent circuit of the semiconductor device shown in FIG. 2 according to the embodiments of FIGS. 3B and 4B.

FIG. 5 is a circuit diagram illustrating an equivalent circuit of the semiconductor device 10*a* shown in FIG. 2 for use in the embodiments of FIGS. 3B and 4B.

Referring to FIGS. 2 and 5, in the semiconductor device 10*a* of FIG. 2, the first transceivers TX1_0 to TX1_7, RX1_0, and RX1_7 of the respective chips 100 to 800 may be replaced with a capacitor C1, the second transceivers TX2_0 to TX2_7, RX2_0, and RX2_7 may be replaced with a capacitor C2, the second pads PD2_0 to PD2_7 may be replaced with a capacitor $C_{pd}$, and the lines L0 to L6 may be replaced with a capacitor $C_L$, an inductor $L_L$, and a resistor $R_L$. Data may be input to the eighth chip 800 (as shown in FIG. 3B) or data may be output from the eighth chip 800 (as shown in FIG. 4B), such that the switch SW1_0 and the switch SW1_7 may be turned on.

Referring to FIG. 5, according to an embodiment of the present disclosure, the first transceiver TX1_7 and RX1_7 and the second transceiver TX2_7 and RX2_7 of the eighth chip 800 configured to transmit data may be coupled to the first transceiver TX1_0 and RX1_0 and the second transceiver TX2_0 and RX2_0 of the first chip 100 by the switches SW1_0 to SW1_7, and the first transceivers TX1_1 to TX1_6 and RX1_1 to RX1_6 of the remaining chips 200 to 700 may be separated from the second transceivers TX2_1 to TX2_6 and RX2_1 to RX2_6. Therefore, the capacitors C1 and C2 corresponding to the first transceivers TX1_1 to TX1_6 and RX1_1 to RX1_6 and the second transceivers TX2_1 to TX2_6 and RX2_1 to RX2_6 of the chips 200 to 700 are separated from each other during data transmission, to thereby reduce the entire load.

Figure 6A:
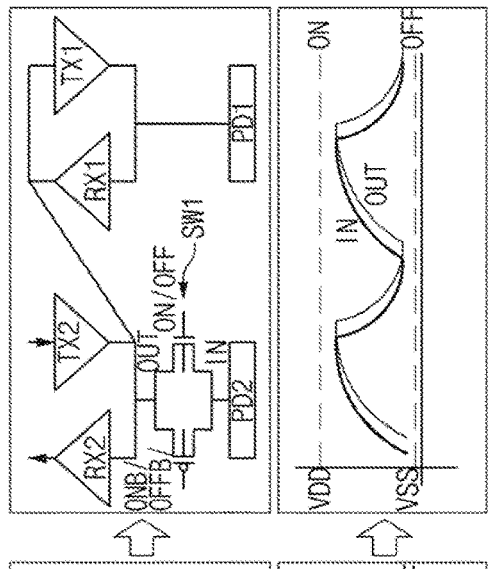
FIG. 6A is a schematic illustrating a semiconductor device and a waveform of the semiconductor device, according to a comparison example.
Figure 6B:
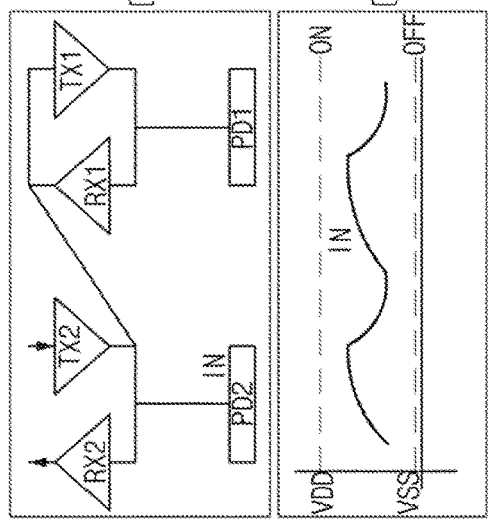
FIGS. 6B to 6D are views illustrating a semiconductor device and waveforms of the semiconductor device according to an embodiment of the present disclosure.
Figure 6C:
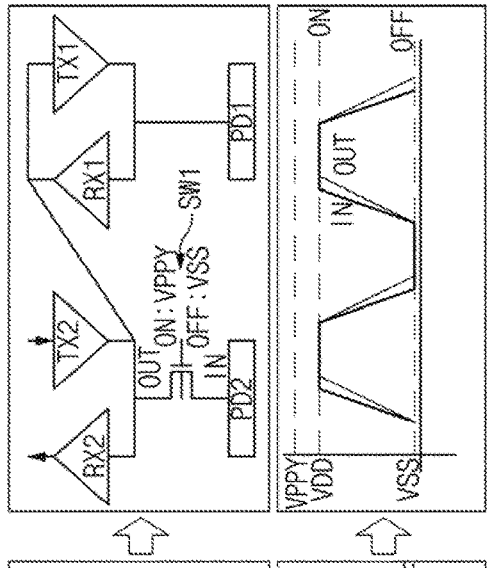
Figure 6D:
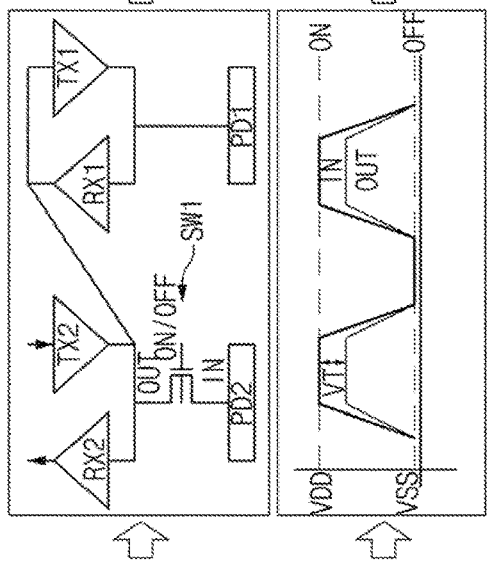

FIG. 6A is a schematic illustrating a semiconductor device and a waveform of the semiconductor device. FIGS. 6B to 6D are views illustrating a semiconductor device and a waveform of the semiconductor device. In the semiconductor device 10*a* of FIG. 2, upper parts of FIGS. 6A, 6B, 6C, and 6D may refer to the first pads PD1_0 to PD1_7 (denoted by PD1) of the first to eighth chips 100 to 800, may refer to the first transceivers TX1_0 to TX1_7 (denoted by TX1) and RX1_0 to RX1_7 (denoted by RX1), may refer to the second pads PD2_0 to PD2_7 (denoted by PD2), may refer to the switches SW1_0 to SW1_7 (denoted by SW1), and may refer to the second transceivers TX2_0 to TX2_7 (denoted by TX2) and RX2_0 to RX2_7 (denoted by RX2).

FIG. 6A illustrates an exemplary case in which the switches SW1_0 to SW1_7 are not contained in the semiconductor device 10*a* of FIG. 2. In this case, as shown in the lower part of FIG. 6A, although data having an amplitude of VDD/2 and swing between a ground voltage VSS and a power-supply voltage VDD is input to the semiconductor device 10*a*, a swing width of the second pad PD2 may be smaller than the power-supply voltage VDD.

FIG. 6B illustrates an exemplary case in which the switches SW1_0 to SW1_7 (denoted by SW1) are contained in the semiconductor device 10*a* according to the embodiment of the present disclosure. In FIG. 6B, the switch SW1 is implemented by using a transfer gate including a PMOS transistor and an NMOS transistor coupled in parallel. As shown in the lower part of FIG. 6B, it can be recognized that the entire load is reduced as compared to FIG. 6A and a swing width between input data IN and output data OUT of the transfer gate increases approximately to the power-supply voltage VDD.

However, the PMOS transistor is generally larger in size than the NMOS transistor. Therefore when data is input to the semiconductor device, the transfer gate is used as load, such that a rising time or a falling time of the input data IN and the output data OUT of the transfer gate may be increased as shown in the lower part of FIG. 6B.

FIG. 6C illustrates an exemplary case in which the switches SW1_0 to SW1_7 of FIG. 1 are comprised of only NMOS transistors. As shown in the upper part of FIG. 6C, the switch SW1 may be implemented as an NMOS transistor. In this case, the entire load is reduced. As a result, as shown in the lower part of FIG. 6C, it can be recognized that the rising time and the falling time of the input data IN and the output data OUT are reduced as compared to the lower part of FIG. 6B.

However, as illustrated in FIG. 6C, when the amplitude of the input data IN for use in the NMOS transistor used as each of the switches SW1_0 to SW1_7 is higher than a voltage level (VDD-VT), and the power-supply voltage VDD is applied to a gate of the NMOS transistor, the amplitude of the output data OUT is limited to the voltage level (VDD-VT).

FIG. 6D illustrates an exemplary case in which a high voltage VDDY having a voltage level higher than the power-supply voltage VDD is input to a gate of a NMOS transistor used as each of the switches SW1_0 to SW1_7.

Referring to FIG. 6D, it can be recognized that the amplitude of output data OUT of the NMOS transistor is not limited to the voltage level (VDD-VT) but increases to the power-supply voltage VDD. That is, according to the embodiment of the present disclosure, since the high voltage VDDY having a voltage level higher than a voltage level of the input data IN is input to the gate of the NMOS transistor, the voltage level of the output data OUT becomes increased.

Figure 7A:
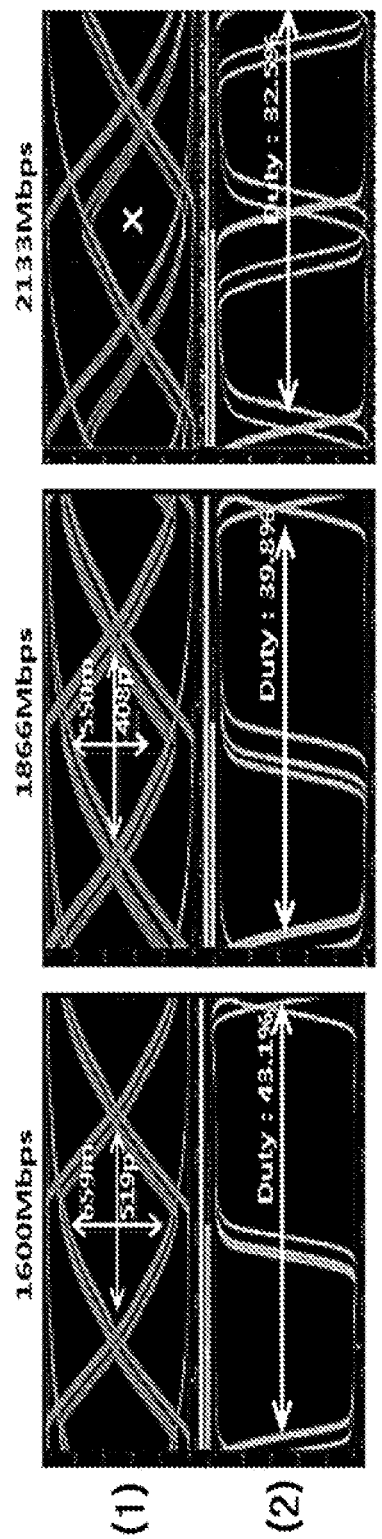
FIGS. 7A and 7B illustrate a waveform of data input to a second pad contained in a fifth chip when data is received by the fifth chip, and a waveform of data having passed through a second receiver contained in the fifth chip.
Figure 7B:
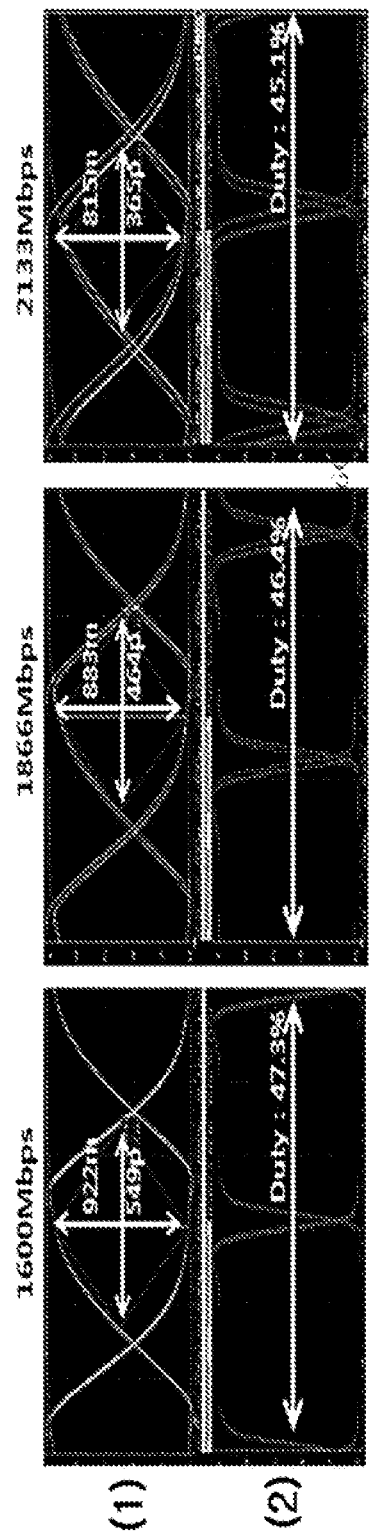

FIGS. 7A and 7B illustrate a waveform of data input to the second pad PD2_4 contained in the fifth chip 500 when data is received by the fifth chip 500, and illustrate waveform of data having passed through the second receiver RX2_4 contained in the fifth chip 500. FIG. 7A illustrates a comparison example in which the switches SW1_0 to SW1_7 are not contained in the semiconductor device 10*a*, and FIG. 7B illustrates an exemplary embodiment in which the semiconductor 10*a* of FIG. 2 includes the switches SW1_0 to SW1_7.

Referring to FIGS. 7A and 7B, assuming that data is transmitted at 1600 Mbps, whereas the comparison example in FIG. 7A illustrates that the width of signal eye is 519 ps and the height of the signal eye is 659 mV, the exemplary embodiment in FIG. 7B illustrates that the width of signal eye increases to 549 ps and the height of signal eye increases to 922 mV. In addition, whereas the comparison example in FIG. 7A has a duty ratio of 43.1%, the duty ratio of the exemplary embodiment in FIG. 7B increases to 47.3%.

Assuming that data is transmitted at 1866 Mbps, whereas the comparison example in FIG. 7A illustrates that the width of signal eye is 408 ps and the height of signal eye is 550 mV, the exemplary embodiment in FIG. 7B illustrates that the width of signal eye increases to 464 ps and the height of signal eye increases to 883 mV. In addition, whereas the comparison example in FIG. 7A has a duty ratio of 39.8%, the duty ratio of the exemplary embodiment in FIG. 7B increases to 46.4%.

Assuming that data is transmitted at 2133 Mps, whereas the comparison example in FIG. 7A is unable to measure the size of signal eye, the exemplary embodiment in FIG. 7B illustrates that the width of signal eye is measured as 365 ps and the height of signal eye is measured as 815 mV. In addition, whereas the comparison example in FIG. 7A has a duty ratio of 32.5%, the duty ratio of the exemplary embodiment in FIG. 7B increases to 45.1%.

Figure 8:
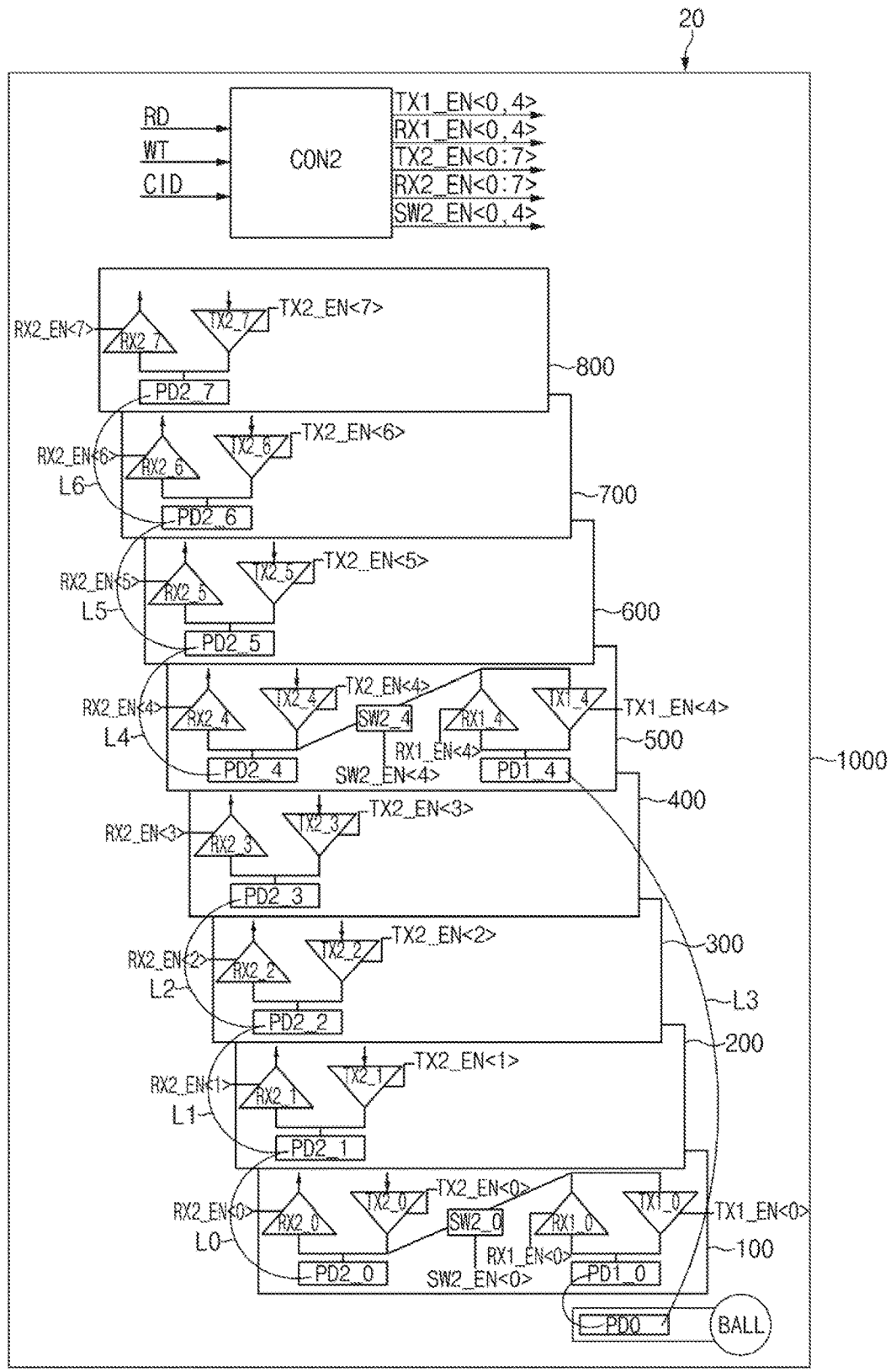
FIG. 8 is a schematic illustrating a semiconductor device according to an embodiment of the present disclosure.

FIG. 8 is a schematic illustrating a semiconductor device 20 according to an embodiment of the present disclosure.

Referring to FIG. 8 the semiconductor device 20 is substantially the same as the semiconductor device 10 of FIG. 1. However, the switches SW1_0 to SW1_7 of the semiconductor device 10 of FIG. 1 are disposed between the second pads PD2_0 to PD2_7 and the second transceivers TX2_0 to TX2_7 and RX2_0 to RX2_7. In contrast, the semiconductor device 20 of FIG. 8 may include a switch SW2_0 disposed between the first transceiver TX1_0 and RX1_0 and the second transceiver TX2_0 and RX2_0 in the first chip 100, may include first transceiver TX1_4 and RX1_4 in the fifth chip 500, and may further include a switch SW2_4 disposed between the first transceiver TX1_4 and RX1_4 and the second transceiver TX2_4 and RX2_4 in the fifth chip 500. In addition, whereas the second pads PD2_0 to PD2_7 contained in the first to eighth chips 100 to 800 for use in the semiconductor device 10 of FIG. 1 are interconnected through the lines L0 to L6, the second pads PD2_0 to PD2_3 contained in the first to fourth chips 100 to 400 for use in the semiconductor device 20 of FIG. 8 are interconnected through the lines L0 to L2, and the second pads PD2_4 to PD2_7 contained in the fifth to eighth chips 500 to 800 are interconnected through the lines L4 to L6. The line L3 of FIG. 8 may couple the external I/O pad PD0 to the first pad PD1_4 contained in the fifth chip 500.

Upon receiving a command (e.g., a read command RD or a write command WT) and a chip ID signal CID, a controller CON2 may generate first transmission enable signals TX1_EN<0> and TX1_EN<4>, first reception enable signals RX1_EN<0> and RX1_EN<4>, second transmission enable signals TX2_EN<0:7>, second reception enable signals RX2_EN<0:7>, and switch enable signals SW2_EN<0> and SW2_EN<4>. The first transmission enable signal TX1_EN<0> and TX1_EN<4> may enable first transmitters TX1_0 and TX1_4 respectively contained in the first and fifth chips 100 and 500, and the first reception enable signal RX1_EN<0> and RX1_EN<4> may enable first receivers RX1_0 and RX1_4 respectively contained in the first and fifth chips 100 and 500. In addition, the second transmission enable signals TX2_EN<0:7> may enable second transmitters TX2_0 to TX2_7 respectively contained in the first to eighth chips 100 to 800, and the second reception enable signals RX2_EN<0:7> may enable second receivers RX2_0 to RX2_7 respectively contained in the first to eighth chips 100 to 800. In addition, the switch enable signal SW2_EN<0> and SW2_EN<4> may enable switches SW2_0 and SW2_4 respectively contained in the first and fifth chips 100 and 500.

Referring to FIG. 8, upon receiving a command (e.g., the write command WT) for inputting data to the semiconductor device 20 and the chip ID signal CID, the controller CON2 may enable the first reception enable signal RX1_EN<0>, the switch enable signal SW2_EN<0> and at least one of the second reception enable signals RX2_EN<0> to RX2_EN<3> of at least one of the chips 100 to 400 corresponding to the chip ID signal CID. Alternatively, the controller CON2 may enable the first reception enable signal RX1_EN<4>, the switch enable signal SW2_EN<4>, and at least one of the second reception enable signals RX2_EN<4> to RX2_EN<7> of at least one of the chips 500 to 800 corresponding to the chip ID signal CID. In addition, upon receiving the command (e.g., the read command RD) for outputting data from the semiconductor device 20 and the chip ID signal CID, the controller CON2 may enable at least one of the second transmission enable signals TX2_EN<0> to TX2_EN<3>, the switch enable signal SW2_EN<0>, and the first transmission enable signal TX1_EN<0>, or may enable at least one of the second transmission enable signals TX2_EN<4> to TX2_EN<7>, the switch enable signal SW2_EN<4>, and the first transmission enable signal TX1_EN<4>. That is, upon receiving the command (e.g., the write command WT or the read command RD) and the chip ID signal CID, when the chip ID signal CID corresponds to the first to fourth chips 100 to 400, the controller CON2 may generate control signal s so as to form a data transmission path ranging from any one second transceiver from among the chips 100 to 400 corresponding to the chip ID signal CID to the first transceiver TX1_0 and RX1_0 contained in the first chip 100.

Figure 9:
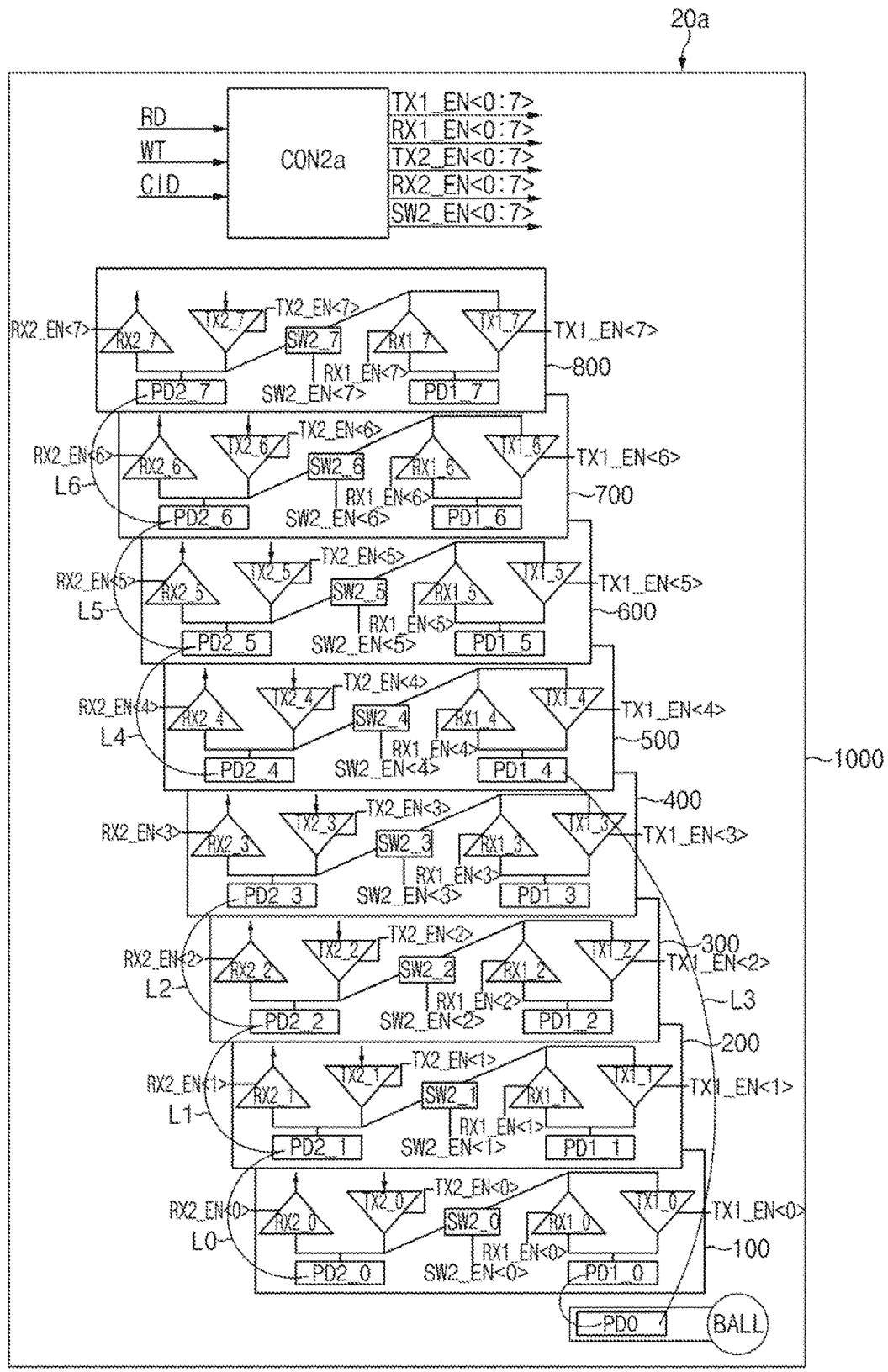
FIG. 9 is a schematic illustrating a semiconductor device according to an embodiment of the present disclosure.

FIG. 9 is a schematic illustrating a semiconductor device 20a according to an embodiment of the present disclosure.

As compared to the semiconductor device 20 of FIG. 8 the semiconductor device 20a shown in FIG. 9 may further include first pads PD1_1 to PD1_3 and PD1_5 to PD1_7, first transceivers TX1_1 to TX1_3, TX1_5 to TX1_7, RX1_1 to RX1_3, and RX1_5 to RX1_7, and switches SW2_1 to SW2_3 contained in the second to fourth chips 200 to 400 and switches SW2_5 to SW2_7 contained in the sixth to eighth chips 600 to 800. The plurality of chips 100 to 800 contained in the semiconductor device 20a may include the same constituent elements for convenience of semiconductor fabrication. Therefore, as shown in FIG. 9, not only the first pads PD1_1 to PD1_3 and PD1_5 to PD1_7 corresponding to the first pads PD1_0 and PD1_4, but also the first transceivers TX1_1 to TX1_3, TX1_5 to TX1_7, RX1_1 to RX1_3, and RX1_5 to RX1_7 corresponding to the first transceivers TX1_0, TX1_4, RX1_0 and RX1_4 may be formed not only in the first and fifth chips 100 and 500 but also in the second to fourth chips 200 to 400 and the sixth to eighth chips 600 to 800. In this case, as described above, data may be received to or transmitted from the second to fourth chips 200 to 400 and the sixth to eighth chips 600 to 800 through the second transceivers TX2_1 to TX2_3, TX2_5 to TX2_7, RX2_1 to RX2_3, and RX2_5 to RX2_7, such that the first transceivers TX1_1 to TX1_3, TX1_5 to TX1_7, RX1_1 to RX1_3, and RX1_5 to RX1_7 need not be operated. Therefore, the controller CON2a may further generate control signals configured not to operate the first transceivers TX1_1 to TX1_3, TX1_5 to TX1_7, RX1_1 to RX1_3, and RX1_5 to RX1_7. As examples of the control signals, the controller CON2a may further generate first transmission enable signals TX1_EN<1:3, 5:7>, first reception enable signals RX1_EN<1:3, 5:7>, and switch enable signals SW2_EN<1:3, 5:7>. That is, the controller CON2a may disable the first transmission enable signals TX1_EN<1:3, 5:7>, the first reception enable signals RX1_EN<1:3, 5:7>, and the switch enable signals SW2_EN<1:3, 5:7>, such that the first transceivers TX1_1 to TX1_3, TX1_5 to TX1_7, RX1_1 to RX1_3, and RX1_5 to RX1_7 may not be operated.

In order not to operate the first transceivers TX1_1 to TX1_3, RX1_1 to RX1_3, TX1_5 to TX1_7, and RX1_5 to RX1_7, although the first transmission enable signals TX1_EN<1:3, 5:7>, the first reception enable signals RX1_EN<1:3, 5:7>, and the switch enable signals SW2_EN<1:3, 5:7> are not disabled for convenience of description, the controller CON2a may also disable only the switch enable signals SW2_EN<1:3, 5:7>. Since the switch enable signals SW2_EN<1:3, 5:7> are disabled, the first transceivers TX1_1 to TX1_3, TX1_5 to TX1_7, RX1_1 to RX1_3, and RX1_5 to RX1_7 are separated from the second transceivers TX2_1 to TX2_3, RX2_1 to RX2_3, TX2_5 to TX2_7, and RX2_5 to RX2_7. Alternatively, only the first transmission enable signals TX1_EN<1:3, 5:7> and the first reception enable signals RX1_EN<1:3, 5:7> may be disabled.

Figure 10A:
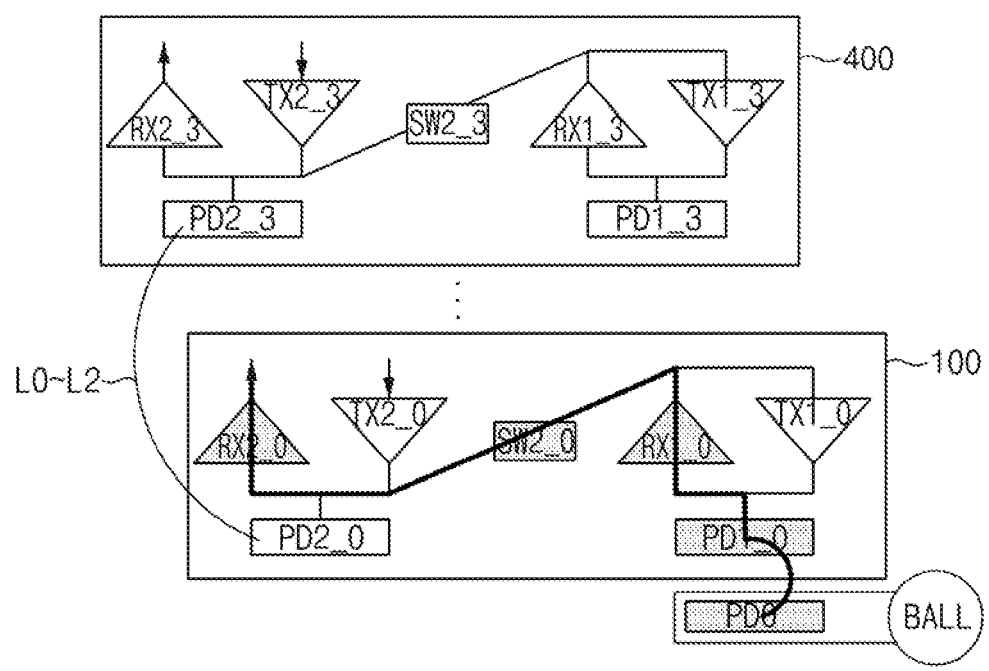
FIG. 10A is a schematic illustrating a data transmission path formed when a write command and chip ID signal corresponding to a first chip are provided to the semiconductor device shown in FIG. 9.

FIG. 10A is a schematic illustrating a data transmission path formed when the write command WT and the chip ID signal CID corresponding to the first chip 100 are provided to the semiconductor device 20a shown in FIG. 9.

Referring to FIGS. 9 and 10A, upon receiving the write command WT and the chip ID signal CID corresponding to the first chip 100, the controller CON2a may enable the first reception enable signal RX1_EN<0>, the switch enable signal SW2_EN<0>, and the second reception enable signal RX2_EN<0>. Therefore, as shown in FIG. 10A, a data transmission path configured to pass through the external I/O pad PD0, the first pad PD1_0 of the first chip 100, the first receiver RX1_0 of the first chip 100, the switch SW2_0 of the first chip 100, and the second receiver RX2_0 of the first chip 100 may be formed.

Figure 10B:
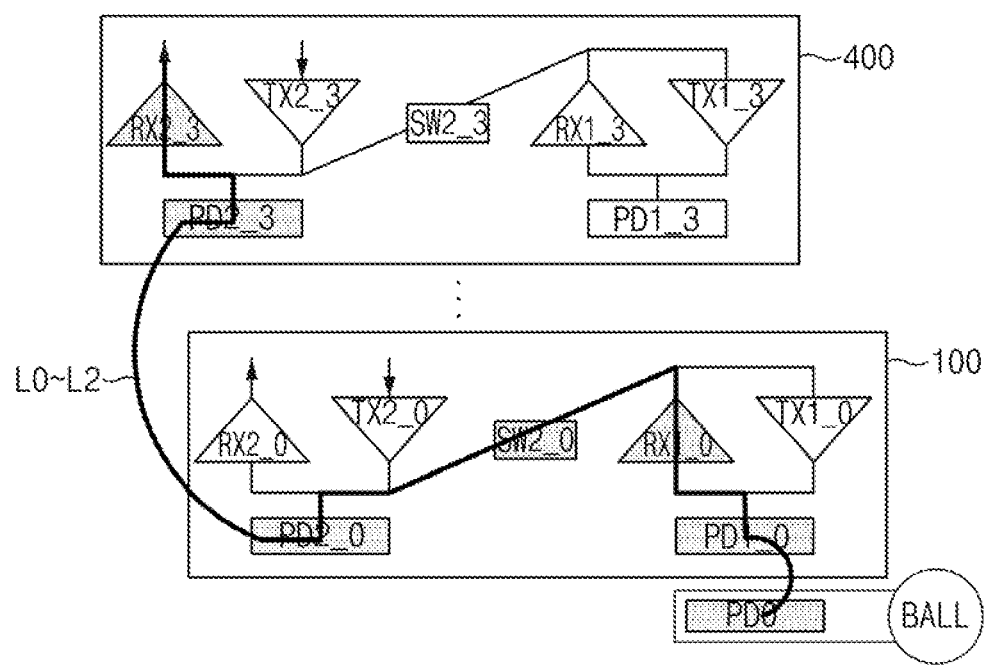
FIG. 10B is a schematic illustrating a data transmission path formed when a write command and a chip ID signal corresponding to a fourth chip are provided to the semiconductor device shown in FIG. 9.

FIG. 10B is a schematic illustrating a data transmission path formed when the write command WT and the chip ID signal CID corresponding to the fourth chip 400 are provided to the semiconductor device 20a shown in FIG. 9.

Referring to FIGS. 9 and 10B upon receiving the write command WT and the chip ID signal corresponding to the fourth chip 400, the controller CON2a may enable the first reception enable signal RX1_EN<0>, the switch enable signal SW2_EN<0>, and the second reception enable signal RX2_EN<3>. Therefore, as shown in FIG. 10B, a data transmission path configured to pass through the external I/O pad PD0, the first pad PD1_0 of the first chip 100, the first receiver RX1_0 of the first chip 100, the switch SW2_0 of the first chip 100 the second pad PD2_0 of the first chip 100, the lines L0, L1, and L2, the second pad PD2_3 of the fourth chip 400, and the second receiver RX2_3 of the fourth chip 400 may be formed.

Figure 11A:
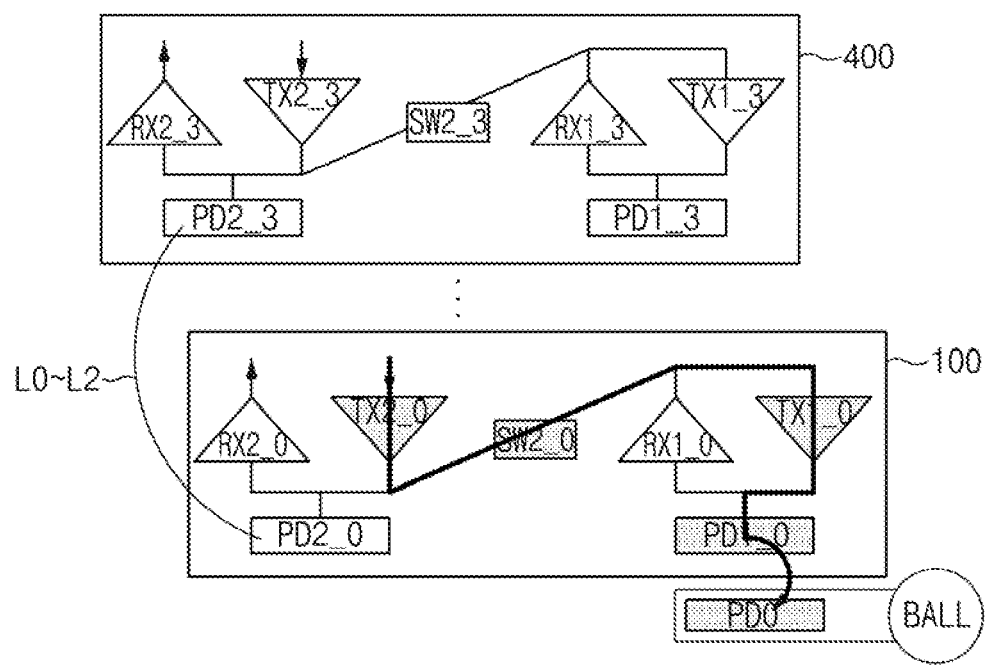
FIG. 11A is a schematic illustrating a data transmission path formed when a read command and a chip ID signal corresponding to a first chip are provided to the semiconductor device shown in FIG. 9.

FIG. 11A is a schematic illustrating a data transmission path formed when the read command RD and the chip ID signal CID corresponding to the first chip 100 are provided to the semiconductor device 20a shown in FIG. 9.

Referring to FIGS. 9 and 11A, upon receiving the read command RD and the chip ID signal CID corresponding to the first chip 100, the controller CON2a may enable the first transmission enable signal TX1_EN<0>, the second transmission enable signal TX2_EN<0>, and the switch enable signal SW2_EN<0>. Therefore, as shown in FIG. 11A, a data transmission path configured to pass through the second transmitter TX2_0 of the first chip 100, the switch SW2_0 of the first chip, the first transmitter TX1_0 of the first chip 100, the first pad PD1_0 of the first chip 100, and the external I/O pad PD0 may be formed.

Figure 11B:
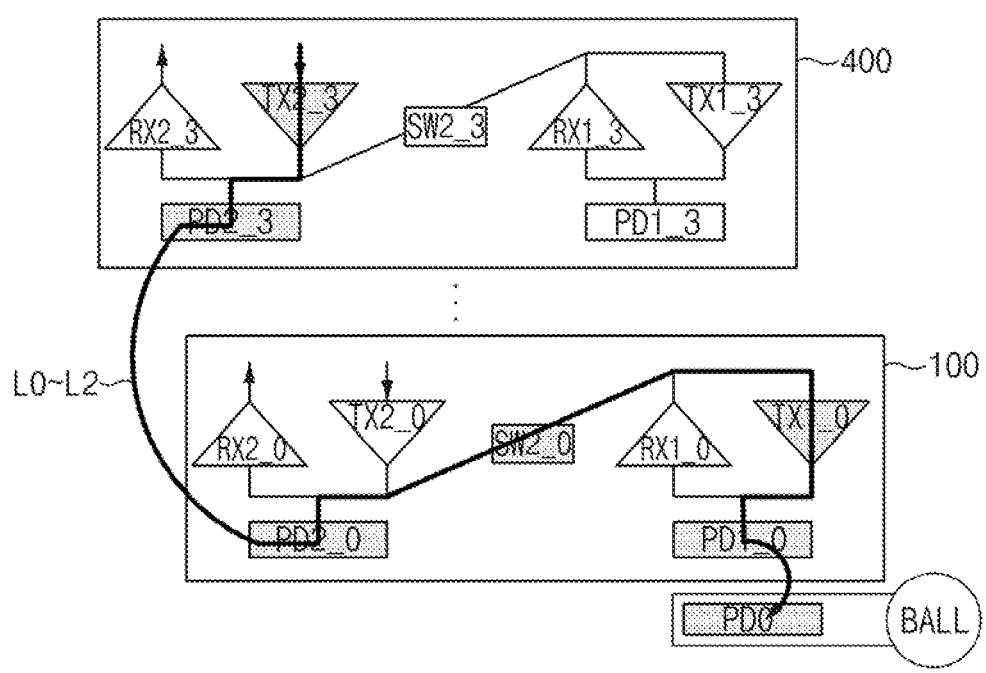
FIG. 11B is a schematic illustrating a data transmission path formed when a read command and a chip ID signal corresponding to a fourth chip are provided to the semiconductor device shown in FIG. 9.

FIG. 11B is a schematic illustrating a data transmission path formed when the read command RD and the chip ID signal CID corresponding to the fourth chip 400 are provided to the semiconductor device 20a shown in FIG. 9.

Referring to FIGS. 9 and 11B, upon receiving the read command RD and the chip ID signal CID corresponding to the fourth chip 400, the controller CON2a may enable the first transmission enable signal TX1_EN<0>, the second transmission enable signal TX2_EN<3>, and the switch enable signal SW2_EN<0>. Therefore, as shown in FIG. 11B, a data transmission path configured to pass through the second transmitter TX2_3 of the fourth chip 400, the first transmitter TX1_0 of the first chip 100, the second pad PD2_3 of the fourth chip 400, lines L0-L2, second pad PD2_0 of the first chip 100, the switch SW2_0 of the first chip 100, the first pad PD1_0 of the first chip 100, and the external I/O pad PD0 may be formed. Although the data transmission path of the semiconductor device 20a shown in FIG. 9 has been disclosed with reference to FIGS. 10A, 10B, 11A, and 11B, it should be noted that the above-mentioned data transmission path may also be similarly applied to the semiconductor device 20 of FIG. 8. For example, the semiconductor device 20 of FIG. 8 does not include the first pads PD1_1 to PD1_3 and PD1_5 to PD1_7, the first transceivers TX1_1 to TX1_3 TX1_5 to TX1_7 RX1_1 to RX1_3, and RX1_5 to RX1_7, and the switches SW2_1 to SW2_3 and SW2_5 to SW2_7. Therefore, the controller CON2 may not generate the first transmission enable signals TX1_EN<1:3, 5:7>, the first reception enable signals RX1_EN<1:3, 5:7>, and the switch enable signals SW2_EN<1:3, 5:7>.

Figure 12:
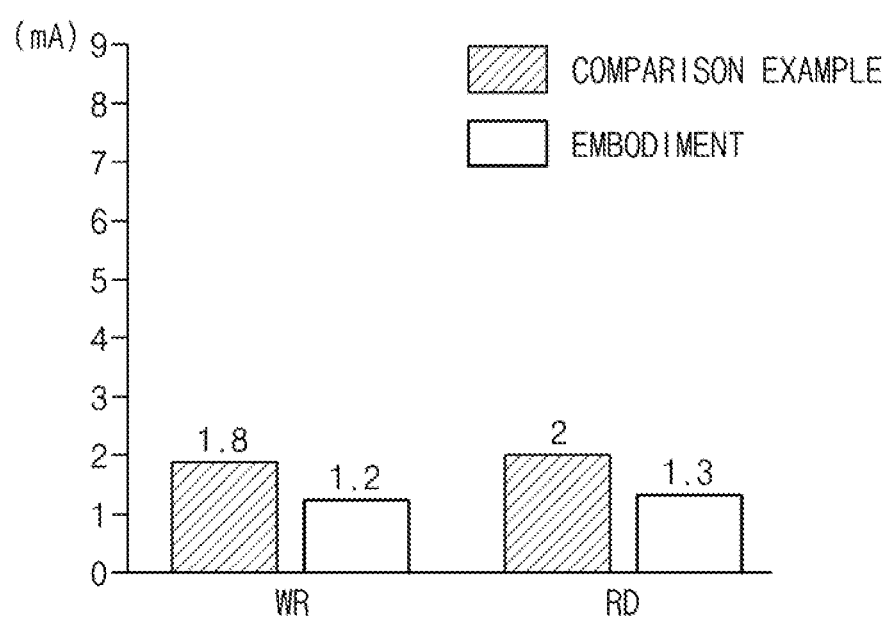
FIG. 12 is a graph illustrating a consumption current of a comparison example and a consumption current of an embodiment of the present disclosure.

FIG. 12 is a graph illustrating a consumption current of the semiconductor device 20a of FIG. 9 and a consumption current of a comparison example in which the semiconductor device 20a of FIG. 9 does not include the switches SW2_0 to SW2_7.

Referring to FIG. 12, during a write operation WR, a consumption current of the embodiment is approximately 1.2 mA whereas a consumption current of the comparison example is approximately 1.8 mA. In addition, during a read operation RD, a consumption current of the embodiment is approximately 1.3 mA whereas a consumption current of the comparison example is approximately 2 mA. That is, the consumption current of the embodiment is reduced by about 33% as compared to the comparison example. Hence, the embodiment of FIG. 9 is superior to the comparison example in terms of the consumption current.

As is apparent from the above description, the semiconductor device according to various embodiments of the present disclosure can increase a data transfer rate by reducing load during data transmission, and can also reduce an operation current.

Those skilled in the art will appreciate that the invention may be carried out in other specific ways than those set forth herein without departing from the spirit and essential characteristics of the invention. The above embodiments are therefore to be construed in all aspects as illustrative and not restrictive. The scope of the invention should be determined by the appended claims and their legal equivalents, not by the above description. Further, all changes coming within the meaning and equivalency range of the appended claims are intended to be embraced therein. In addition, it is obvious to those skilled in the art that features in different claims that do not explicitly refer to each other in the appended claims may be presented in different combinations as modified embodiments of the invention or included in a new claim by a subsequent amendment after the application is filed.

Although a number of illustrative embodiments consistent with the invention have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A semiconductor device comprising:
a plurality of chips, each chip including a chip input/output (I/O) pad, a transceiver configured to perform a transmission operation in response to a transmission enable signal or perform a reception operation in response to a reception enable signal, and a switch configured to couple the chip input/output (I/O) pad to the transceiver in response to a switch enable signal;
at least one line configured to couple the chip input/output (I/O) pads contained in the plurality of chips; and
a controller configured to generate the transmission enable signal, the reception enable signal, and the switch enable signal in response to a command signal and a chip identifier (ID) signal,
wherein the chip input/output (I/O) pad is coupled to the transceiver when the switch enable signal is enabled in at least one chip corresponding to the chip ID signal among the plurality of chips.

2. The semiconductor device according to claim 1, wherein at least one of the plurality of chips further includes:
a common transceiver that is coupled to a transceiver contained in a corresponding chip, and performs a transmission operation in response to a common transmission enable signal or performs a reception operation in response to a common reception enable signal; and
a common input/output (I/O) pad coupled to the common transceiver, and
the controller generates the common transmission enable signal and the common reception enable signal on the basis of the command signal and the chip ID signal.

3. The semiconductor device according to claim 2, wherein:
when the command is a command for transmitting data to any one of the plurality of chips, the controller enables the common reception enable signal, a switch enable signal of a switch contained in the corresponding chip in which the common transceiver is contained from among the plurality of chips, a switch enable signal of a switch contained in a chip corresponding to the chip ID signal from among the plurality of chips, and a reception enable signal of a transceiver contained in the chip corresponding to the chip ID signal.

4. The semiconductor device according to claim 2, wherein:
when the command is a command for transmitting data from any one of the plurality of chips, the controller enables a transmission enable signal of a transceiver contained in a chip corresponding to the chip ID signal from among the plurality of chips, a switch enable signal of a switch contained in the chip corresponding to the chip ID signal, a switch enable signal of a switch contained in the corresponding chip in which the common transceiver is contained from among the plurality of chips, and the common transmission enable signal.

5. The semiconductor device according to claim 2, further comprising:
a substrate configured to include an external pad through which external data is transmitted,
wherein the common input/output (I/O) pad is coupled between the common transceiver and the external pad.

6. The semiconductor device according to claim 1, wherein the chip input/output (I/O) pads of two adjacent chips from among the plurality of chips are coupled through the line.

7. The semiconductor device according to claim 1, wherein the switches contained in the plurality of chips include transfer gates.

8. The semiconductor device according to claim 1, wherein the switch contained in each of the plurality of chips is an NMOS transistor.

9. The semiconductor device according to claim 8, wherein:
when the switch enable signal is enabled, a voltage having a voltage level higher than a voltage corresponding to a swing width of data applied to the semiconductor device is applied to a gate of the NMOS transistor.

10. The semiconductor device according to claim 1, wherein:
when the command is a command for transmitting data to any one of the plurality of chips, the controller enables a switch enable signal of a switch contained in a chip corresponding to the chip ID signal from among the plurality of chips, and enables a reception enable signal of a transceiver contained in the chip corresponding to the chip ID signal.

11. The semiconductor device according to claim 10, wherein the controller disables a switch enable signal of each switch contained in the remaining chips from among the plurality of chips.

12. The semiconductor device according to claim 1, wherein:
when the command is a command for transmitting data from any one of the plurality of chips, the controller enables a switch enable signal of a switch contained in a chip corresponding to the chip ID signal from among the plurality of chips, and a transmission enable signal of a transceiver contained in the chip corresponding to the chip ID signal.

13. A semiconductor device comprising:
a first chip including a common transceiver configured to perform a transmission operation in response to a common transmission enable signal or perform a reception operation in response to a common reception enable signal, a first transceiver configured to perform a transmission operation in response to a first transmission enable signal or perform a reception operation in response to a first reception enable signal, and a switch configured to couple the common transceiver to the first transceiver in response to a switch enable signal;
a second chip including a second transceiver coupled to the first transceiver through a line, configured to perform a transmission operation in response to a second transmission enable signal or a reception operation in response to a second reception enable signal; and a controller configured to generate the common transmission enable signal, the common reception enable signal, the first transmission enable signal, the first reception enable signal, the switch enable signal, the second transmission enable signal and the second reception enable signal, in response to a command signal and a chip identifier (ID) signal.

14. The semiconductor system according to claim 13, further comprising:
    a substrate in which an external input/output (I/O) pad is formed,
    wherein the first chip further includes a common input/output (I/O) pad coupled between the common transceiver and the external input/output (I/O) pad.

15. The semiconductor system according to claim 13, wherein:
    the first chip further includes a first chip input/output (I/O) pad coupled to the first transceiver; and
    the second chip further includes a second chip input/output (I/O) pad coupled to the second transceiver,
    wherein the first chip input/output (I/O) pad is coupled to the second chip input/output (I/O) pad through the line.

16. The semiconductor system according to claim 13, wherein:
    when the command is a command for transmitting data to any one of the first chip and the second chip or a command for transmitting data from any one of the first chip and the second chip, the controller enables the switch enable signal.

17. The semiconductor system according to claim 16, wherein:
    when the command is a command for transmitting data to any one of the first chip and the second chip, the controller enables the common reception enable signal, the switch enable signal, and one of the first and second reception enable signals selected in response to the chip ID signal.

18. The semiconductor system according to claim 16, wherein:
    when the command is a command for transmitting data from any one of the first chip and the second chip, the controller enables one of the first and second transmission enable signals selected in response to the chip ID signal, the switch enable signal, and the common transmission enable signal.

19. The semiconductor device according to claim 13, wherein the switch is an NMOS transistor.

20. The semiconductor device according to claim 19, wherein a voltage having a voltage level higher than a voltage corresponding to a swing width of data applied to the semiconductor device is applied to a gate of the NMOS transistor.

* * * * *